(12) United States Patent
Piel

(10) Patent No.: US 10,248,354 B2
(45) Date of Patent: Apr. 2, 2019

(54) HYPERVISOR ENABLING SECURE COMMUNICATION BETWEEN VIRTUAL MACHINES BY MANAGING EXCHANGING ACCESS TO READ BUFFER AND WRITE BUFFER WITH A QUEUING BUFFER

(71) Applicant: Robert Bosch GmbH, Stuttgart (DE)

(72) Inventor: Gunnar Piel, Hemmingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 138 days.

(21) Appl. No.: 15/221,274

(22) Filed: Jul. 27, 2016

(65) Prior Publication Data

US 2017/0031628 A1 Feb. 2, 2017

(30) Foreign Application Priority Data

Jul. 29, 2015 (DE) .......................... 10 2015 214 424

(51) Int. Cl.
*G06F 3/06* (2006.01)
*G06F 9/455* (2018.01)

(52) U.S. Cl.
CPC .......... *G06F 3/0647* (2013.01); *G06F 3/0604* (2013.01); *G06F 3/0683* (2013.01); *G06F 9/45558* (2013.01); *G06F 2009/45583* (2013.01)

(58) Field of Classification Search
CPC .... G06F 3/0647; G06F 3/0604; G06F 3/0683; G06F 9/45558; G06F 2009/45583
See application file for complete search history.

(56) References Cited

U.S. PATENT DOCUMENTS 5,974,518 A * 10/1999 Nogradi ................. H04L 49/90
709/236
2005/0114855 A1* 5/2005 Baumberger ....... G06F 9/45558
718/1

(Continued)

FOREIGN PATENT DOCUMENTS

WO 2008095548 A1 8/2008

OTHER PUBLICATIONS

Diakhate, Francois. Efficient Shared Memory Message Passing for Inter-VM Communications. Copywrite Springer-Verlag Berlin Heidelberg 2009. (Year: 2009).*

*Primary Examiner* — Meng Ai T An
*Assistant Examiner* — Michael W Ayers
(74) *Attorney, Agent, or Firm* — Norton Rose Fulbright US LLP; Gerard Messina

(57) ABSTRACT

A hypervisor manages a read buffer, a write buffer and a queuing buffer in a memory used jointly by the first virtual machine and the second virtual machine, the read buffer, the write buffer and the queuing buffer having the same size. The hypervisor assigns the read buffer to a read area readable by the first virtual machine, assigns the write buffer to a write area writable by the second virtual machine and assigns the queuing buffer to a queuing area of the memory that is inaccessible to the first virtual machine and to the second virtual machine. In response to a first request by the first virtual machine, the hypervisor performs a reader-side exchange of the read buffer for the queuing buffer and in response to a second request by the second virtual machine, the hypervisor performs a writer-side exchange of the write buffer for the queuing buffer.

12 Claims, 3 Drawing Sheets

(56) References Cited

U.S. PATENT DOCUMENTS

| | | | |
|---|---|---|---|
| 2007/0288921 A1* | 12/2007 | King | G06F 9/45537 718/1 |
| 2009/0249357 A1* | 10/2009 | Chanda | G06F 9/45533 719/314 |
| 2013/0332676 A1* | 12/2013 | Kotla | G06F 12/0848 711/129 |
| 2015/0026681 A1* | 1/2015 | Lin | G06F 9/45533 718/1 |
| 2016/0070585 A1* | 3/2016 | Tsirkin | G06F 9/45558 718/1 |
| 2016/0266938 A1* | 9/2016 | Suzuki | G06F 9/5083 |
| 2017/0250817 A1* | 8/2017 | Bonzini | H04L 9/3247 |

* cited by examiner ously written data. If the reading virtual machine on average reads
HYPERVISOR ENABLING SECURE COMMUNICATION BETWEEN VIRTUAL MACHINES BY MANAGING EXCHANGING ACCESS TO READ BUFFER AND WRITE BUFFER WITH A QUEUING BUFFER

CROSS REFERENCE

The present application claims the benefit under 35 U.S.C. § 119 of German Patent Application No. DE 102015214424.0 filed on Jul. 29, 2015, which is expressly incorporated herein by reference in its entirety.

FIELD

The present invention relates to a method for communication between a first virtual machine and a second virtual machine under a hypervisor. The present invention also relates to a corresponding device, a corresponding computer program as well as a corresponding storage medium.

BACKGROUND INFORMATION

Conventionally, the simulation of a real existing or hypothetical computer system in practical informatics is called a virtual machine (VM) among experts. In an appropriate software architecture, so-called hypervisor allows for the simultaneous operation of multiple virtual machines on one physical machine, the so-called host system. The hypervisor in this context manages the hardware resources of the host system such as the central processing unit (CPU), shared memory and possible peripheral devices and assigns these to the individual virtual machines as needed.

PCT Published Application No. WO 2008/095548 A1 describes a management module, a producer processor and consumer processor, system thereof and method for communication between processors via a shared memory, said module including: means for storing and managing the states of triple buffers, each buffer having a read sub-buffer, a write sub-buffer and an idle sub-buffer, a means for communicating with at least one producer processor and at least one consumer processor and said management means being designed to determine a specific read sub-buffer or write sub-buffer among the triple buffers in response to a producer processor or consumer processor access.

SUMMARY

The present invention provides a method for communication between a first virtual machine and a second virtual machine under a hypervisor, a corresponding device, a corresponding computer program as well as a corresponding memory medium.

One advantage of the approach described herein lies in the data consistency of the communication of the present invention between the virtual machines, which does not depend on an interactive behavior in the respective virtual machines.

Embodiments of the present invention may include a provision that the reader-side exchange and the writer-side exchange respectively form an atomic operation. A corresponding specific embodiment is completely asynchronous such that the extremely important temporal separation between virtual machines is preserved.

According to another aspect, there may be a provision for the queuing buffer to be one among multiple queuing buffers managed by the hypervisor in the memory, which are of the same size and which form a queue ordered in time according to their writer-side exchange. This variant takes the requirements of continuous data streams into account: Here it is expected that the reading virtual machine receives an uninterrupted data stream, even when the reading virtual machine is temporarily slower than the writing virtual machine.

According to another aspect, there may be a provision for the hypervisor to control a memory protection unit (MPU) connected to the memory—in particular a memory management unit (MMU)—which protects the read area against write accesses and the queuing area against write accesses as well as read accesses by the first virtual machine or the second virtual machine, the reader-side exchange and the writer-side exchange occurring by way of the memory protection unit. This specific embodiment ensures that the temporal and spatial separation between the virtual machines cannot be breached by a malicious or faulty behavior of a virtual machine by way of the communication between the virtual machines.

According to another aspect, there may be a provision for the hypervisor, following the reader-side exchange, to return to the first virtual machine a memory address of the exchanged read buffer related to the memory and for the hypervisor, following the writer-side exchange, to return to the second virtual machine a memory address of the exchanged write buffer related to the memory. In this manner, the data transfer causes as little additional runtime expenditure as possible, as would be caused by the copying of data between the buffers to be exchanged.

According to another aspect, there may be a provision for the first virtual machine to continue a read access to the read area following the first request by way of the returned memory address and for the second virtual machine to continue a write access to the write area following the second request by way of the returned memory address. In this case, each virtual machine has a buffer available for as long as it requires it and is thus temporarily independent of the other virtual machine.

Finally, there may be a provision for the first virtual machine and the second virtual machine to repeat the read accesses and the write accesses. In the process, the reader always receives the buffer having the oldest continuously written data. If the reading virtual machine on average reads faster than the writing virtual machine writes the data stream, the data stream has no gaps.

BRIEF DESCRIPTION OF THE DRAWINGS

Exemplary embodiments of the present invention are shown in the figures and are explained in greater detail below.

DETAILED DESCRIPTION OF EXAMPLE EMBODIMENTS

Figure 1:
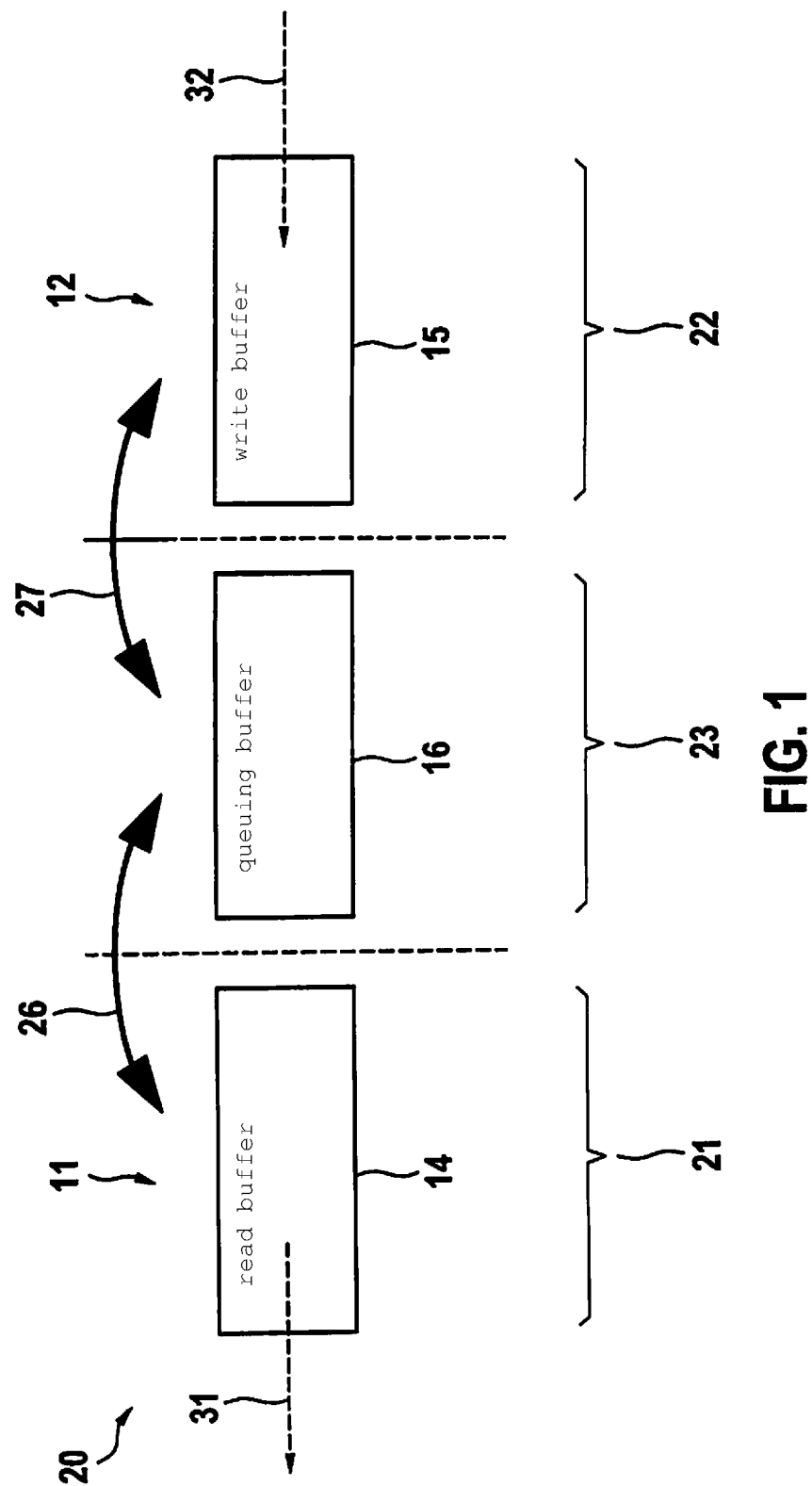
FIG. 1 show the block diagram of a memory used in connection with a first specific embodiment.
Figure 2:
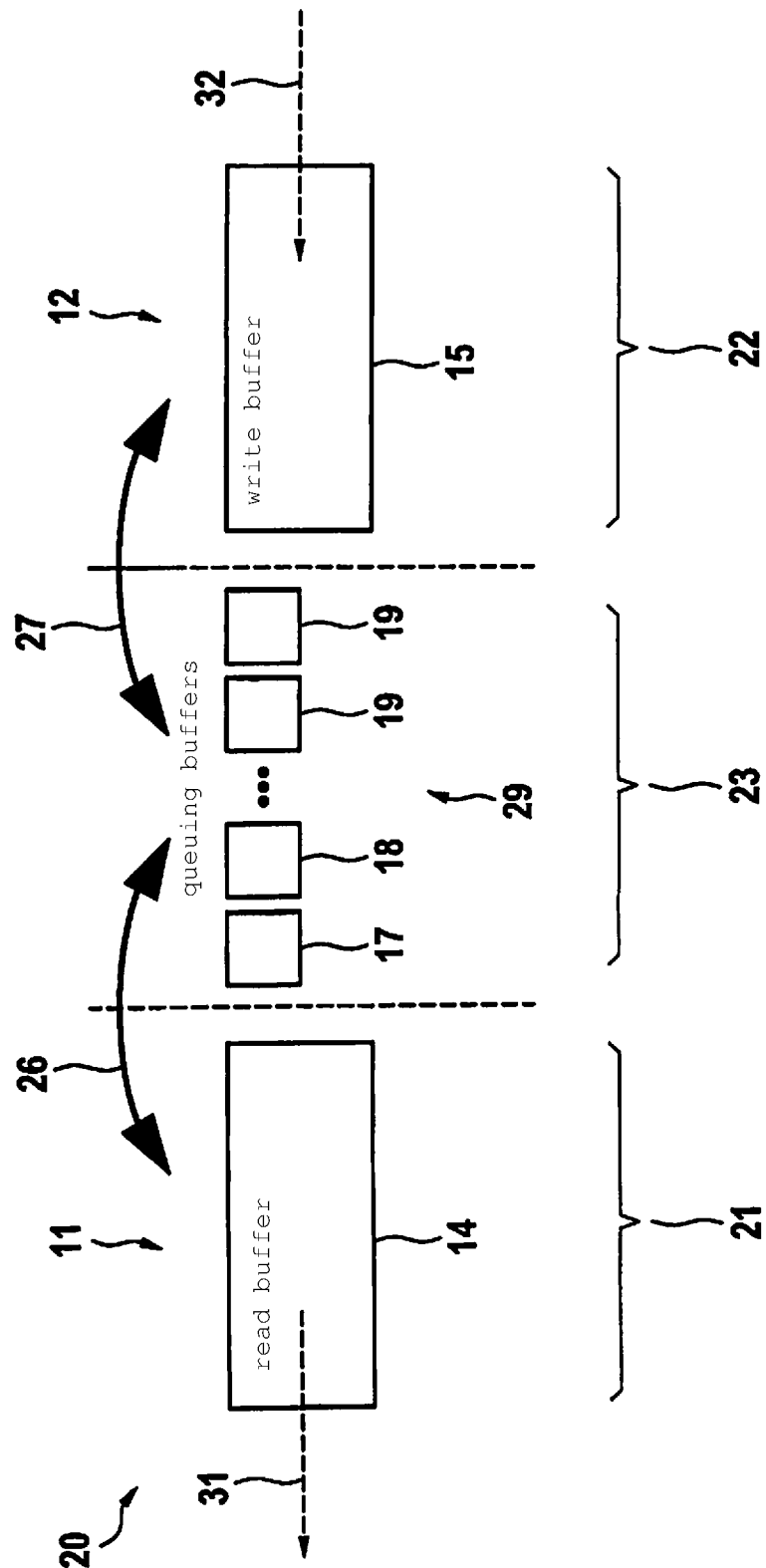
FIG. 2 show the block diagram of a memory used in connection with a second specific embodiment.

FIG. 1 and FIG. 2 illustrate schematically a method 10 according to the present invention for communication between a first virtual machine 11 and a second virtual machine 12 under a hypervisor 13. For this purpose, the following steps are used:

As shown in FIG. 1, there is a read buffer 14, a write buffer 15 and a queuing buffer 16 of an arbitrary but identical size. As in the scenario shown in FIG. 2, the queuing buffer may by all means be one of multiple queuing buffers 17, 18, 19, which together form a queue 29. Buffers 14, 15, 16, 17, 18, 19 may be in any kind of memory 20. Normally, they are in the random access memory (RAM).

Figure 3:
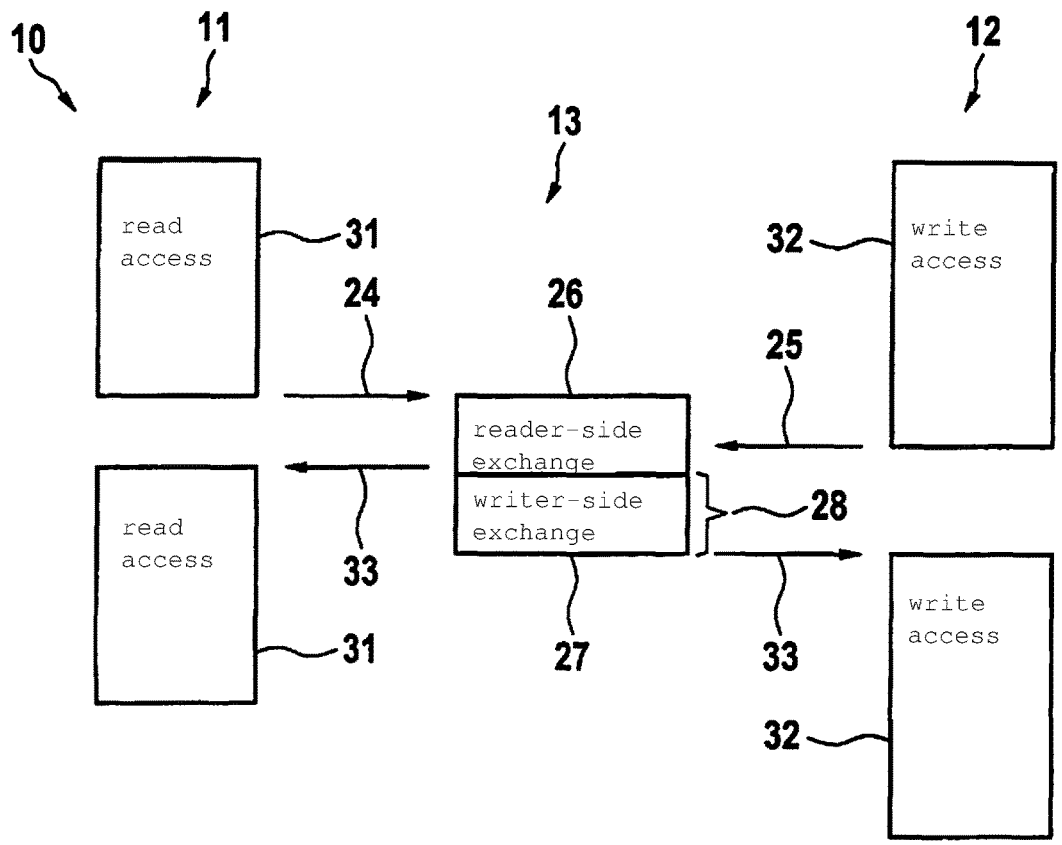
FIG. 3 show the simplified sequence diagram of a method according to one of the specific embodiments.

The access 31, 32 to buffers 14, 15, 16, 17, 18, 19 shown in FIG. 3 is protected by a memory management unit or other memory protection unit. The memory protection unit is controlled only by hypervisor 13.

Hypervisor 13 configures the memory protection unit in such a way that read buffer 14 is readable by first virtual machine 11 and write buffer 15 is writable by second virtual machine 12. All queuing buffers 16, 17, 18, 19 are accessible neither to first virtual machine 11 nor to second virtual machine 12.

First virtual machine 11 and second virtual machine 12 are able to read read buffer 14, and, respectively, write to write buffer 15, for as long as they require it.

When the writing second virtual machine 12 has terminated write access 32, it notifies hypervisor 13 by the first request 24 of a respective application programming interface (API). Hypervisor 13 withdraws from second virtual machine 12 the write access 32 to current write buffer 15. Instead, it grants second virtual machine 12 write access 32 to one of the unoccupied queuing buffers 19, whose data have already been read out. It manages to do this by reconfiguring the memory protection unit. Finally, the hypervisor 13 returns to the second virtual machine 12 the memory address 33 of the now accessible write buffer 15 in the response to the first request 24 via the application programming interface. The hypervisor 13 ensures that all of this occurs as an atomic operation 28.

The writing second virtual machine 12 now has a new write buffer 15, to which it is able to write.

When the reading first virtual machine 11 has terminated read access 31, it notifies hypervisor 13 by a second request 25 of the application programming interface. Hypervisor 13 withdraws from first virtual machine 11 the read access 31 to current read buffer 14. Instead, it grants first virtual machine 11 read access 31 to queuing buffer 17, which contains the oldest written data. It manages to do this by reconfiguring the memory protection unit. Finally, hypervisor 13 returns to first virtual machine 11 the memory address 33 of the now accessible read buffer 14 in the response to the second request 25 via the application programming interface. Hypervisor 13 ensures that all of this occurs as an atomic operation 28.

The reading first virtual machine 11 now has a new read buffer 14, from which it is able to read.

The read accesses and write accesses 32 may be repeated for an indefinite period of time.

Figure 4:
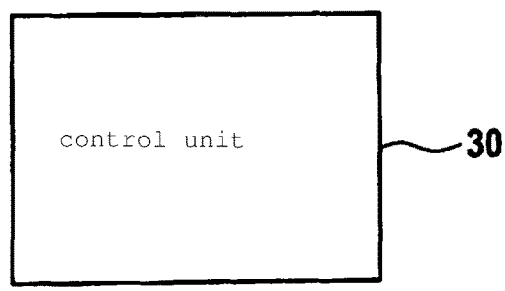
FIG. 4 show a control unit according to a third specific embodiment of the present invention, in a schematic representation.

This method 10 may be implemented for example in software or hardware or in a mixed form of software and hardware for example in a control unit 30, as the schematic representation of FIG. 4 illustrates.

What is claimed is:

1. A method for communication between a first virtual machine and a second virtual machine, the communication being managed by a hypervisor that manages the first virtual machine and the second virtual machine, the method comprising:

managing, by the hypervisor, a read buffer, a write buffer and a queuing buffer in a memory used by the first virtual machine and the second virtual machine, the read buffer, the write buffer and the queuing buffer having the same size, the managing including granting and withdrawing read and write access to each of the buffers;

assigning, by the hypervisor, the read buffer to a read area of the memory and granting, by the hypervisor, read access to the read buffer by the first virtual machine, assigning, by the hypervisor, the write buffer to a write area of the memory and granting, by the hypervisor, write access to the write buffer by the second virtual machine, and assigning, by the hypervisor, the queuing buffer to a queuing area of the memory and withdrawing, by the hypervisor, read and write access to the queuing buffer by the first virtual machine and to the second virtual machine;

writing, by the second virtual machine, data to the write buffer;

exchanging, in response to a second request by the second virtual machine, by the hypervisor, write access to the write buffer by the second virtual machine for write access to the queuing buffer by the second virtual machine, by the hypervisor withdrawing from the second virtual machine write access to the write buffer and granting to the second virtual machine write access to the queuing buffer so that: (i) the queuing buffer to which write access is granted forms a current write buffer and is assigned to the write area of the memory, and (ii) the write buffer to which write access is withdrawn forms a current queuing buffer and is assigned to the queuing area of the memory;

exchanging, in response to a first request by the first virtual machine, by the hypervisor, read access to the read buffer by the first virtual machine for read access to the current queuing buffer by the first virtual machine, by the hypervisor withdrawing from the first virtual machine read access to the read buffer and granting to the first virtual machine read access to the current queuing buffer so that (i) the current queuing buffer to which read access is granted forms a current read buffer and is assigned to the read area of the memory, and (ii) the read buffer to which read access is withdrawn is assigned to the queuing area;

wherein after the read access exchange, the first virtual machine reading, from the current read buffer, the data written by the second virtual machine.

2. The method as recited in claim 1, wherein each of the read access exchange and the write access exchange is a forms a respective atomic operation.

3. The method as recited in claim 1, wherein the queuing buffer is one of multiple queuing buffers managed by the hypervisor in the memory, the multiple queuing buffers jointly forming a queue ordered in time according to a time of their respective write access exchange.

4. The method as recited in claim 1, wherein the hypervisor controls a memory protection unit connected to the memory, wherein the memory protection unit protects the read area of the memory against any write accesses, and protects the queuing area against write accesses and read accesses by the first virtual machine and the second virtual machine, and wherein the read access exchange and the write access exchange occur by way of the memory protection unit.

5. The method as recited in claim 4, wherein the memory protection unit is a memory management unit.

6. The method as recited in claim 4, wherein, following the read access exchange, the hypervisor returns to the first virtual machine a memory address of the current read buffer, and following the write access exchange, the hypervisor returns to the second virtual machine a memory address of the current write buffer.

7. The method as recited in claim 6, wherein the first virtual machine accesses for reading and reads from the current read buffer by way of the returned memory address, and the second virtual machine accesses for writing and writes to the current write buffer by way of the returned memory address.

8. The method as recited in claim 7, wherein the first virtual machine and the second virtual machine repeat the read accesses and the write accesses.

9. A non-transitory machine-readable storage medium on which is stored a computer program, which is executable by a processor, comprising:
   a program code arrangement having program code for a hypervisor for communication between a first virtual machine and a second virtual machine, the communication being managed by the hypervisor that manages the first virtual machine and the second virtual machine, by causing the processor to perform the following:
   managing, by the hypervisor, a read buffer, a write buffer and a queuing buffer in a memory used by the first virtual machine and the second virtual machine, the read buffer, the write buffer and the queuing buffer having the same size, the managing including granting and withdrawing read and write access to each of the buffers;
   assigning, by the hypervisor, the read buffer to a read area of the memory and granting, by the hypervisor, read access to the read buffer by the first virtual machine, assigning, by the hypervisor, the write buffer to a write area of the memory and granting, by the hypervisor, write access to the write buffer by the second virtual machine, and assigning, by the hypervisor, the queuing buffer to a queuing area of the memory and withdrawing, by the hypervisor, read and write access to the queuing buffer by the first virtual machine and the second virtual machine;
   writing, by the second virtual machine, data to the write buffer;
   exchanging, by the hypervisor, in response to a second request by the second virtual machine, write access to the write buffer by the second virtual machine for write access to the queuing buffer by the second virtual machine, by withdrawing from the second virtual machine write access to the write buffer and granting to the second virtual machine write access to the queuing buffer so that: (i) the queuing buffer to which write access is granted forms a current write buffer and is assigned to the write area of the memory, and (ii) the write buffer to which write access is withdrawn forms a current queuing buffer and is assigned to the queuing area of the memory;
   exchanging, by the hypervisor, in response to a first request by the first virtual machine, read access of the read buffer by the first virtual machine for read access to the current queuing buffer by the first virtual machine, by withdrawing from the first virtual machine read access to the read buffer and granting to the first virtual machine read access to the current queuing buffer so that (i) the current queuing buffer to which read access is granted forms a current read buffer and is assigned to the read area of the memory, and (ii) the read buffer to which read access is withdrawn is assigned to the queuing area;
   wherein after the read access exchange, the first virtual machine reading from the current read buffer, the data written by the second virtual machine.

10. A device for a hypervisor for managing communication between a first virtual machine and a second virtual machine managed by the hypervisor, comprising:
   a processing unit configured to perform the following:
   managing, by the hypervisor, a read buffer, a write buffer and a queuing buffer in a memory used by the first virtual machine and the second virtual machine, the read buffer, the write buffer and the queuing buffer having the same size, the managing including granting and withdrawing read and write access to each of the buffers;
   assigning by the hypervisor, the read buffer to a read area of the memory and granting, by the hypervisor, read access to the read buffer by the first virtual machine, assigning, by the hypervisor, the write buffer to a write area of the memory and granting, by the hypervisor, write access to the write buffer by the second virtual machine, and assigning, by the hypervisor, the queuing buffer to a queuing area of the memory and withdrawing, by the hypervisor, read and write access to the queuing buffer by the first virtual machine and the second virtual machine;
   writing, by the second virtual machine, data to the write buffer;
   exchanging, by the hypervisor, in response to a second request by the second virtual machine, write access to the write buffer by the second virtual machine for write access to the queuing buffer by the second virtual machine, by withdrawing from the second virtual machine write access to the write buffer and granting to the second virtual machine write access to the queuing buffer so that: (i) the queuing buffer to which write access is granted forms a current write buffer and is assigned to the write area of the memory, and (ii) the write buffer to which write access is withdrawn forms a current queuing buffer and is assigned to the queuing area of the memory;
   exchanging, by the hypervisor, in response to a first request by the first virtual machine, read access to the read buffer by the first virtual machine for read access to the current queuing buffer by the first virtual machine, by withdrawing from the first virtual machine read access to the read buffer and granting to the first virtual machine read access to the current queuing buffer so that (i) the current queuing buffer to which read access is granted forms a current read buffer and is assigned to the read area of the memory, and (ii) the read buffer to which read access is withdrawn is assigned to the queuing area;
   wherein after the read access exchange, the first virtual machine reading from the current read buffer, the data written by the second virtual machine.

11. The non-transitory machine-readable storage medium as recited in claim 9, wherein the hypervisor controls a memory protection unit connected to the memory, wherein the memory protection unit protects the read area of the memory against any write accesses, and protects the queuing area against write accesses and read accesses by the first virtual machine and the second virtual machine, and wherein the read access exchange and the write access exchange occur by way of the memory protection unit.

12. The device as recited in claim 10, wherein the hypervisor controls a memory protection unit connected to the memory, wherein the memory protection unit protects the read area of the memory against any write accesses, and protects the queuing area against write accesses and read accesses by the first virtual machine and the second virtual machine, and wherein the read access exchange and the write access exchange occur by way of the memory protection unit.

\* \* \* \* \*